Patented Apr. 7, 1931

1,799,496

UNITED STATES PATENT OFFICE

CLEMENS BERGELL, OF BERLIN-ZEHLENDORF, GERMANY

PROCESS OF SAPONIFYING FATS AND OILS

No Drawing. Application filed March 21, 1928, Serial No. 263,579, and in Germany August 9, 1926.

This invention relates to a process for saponifying fats and oils in such a manner as to ensure absolute saponification.

Two different principal methods of saponification are used in the art for the saponification of oils and fats. The one generally described way being that the fat and lye are boiled together. In order to keep the mass thus obtained in a sufficiently liquid state for boiling, salt is added to it and the boiling continued until saponification is carried out as far as possible.

The last traces of neutral fat being very difficult to saponify, it is necessary to continue the boiling process for a very long time, as it is absolutely necessary to completely saponify to prevent the soap from becoming rancid.

In this process no particular importance is attached to the concentration in respect of the water and electrolyte content, and consequently the additions, which are suitable for finishing the saponification in a shorter time, are not only disregarded, but even avoided. According to the degree to which the soap mass, owing to the presence of electrolyte approaches the salting out condition, the soap assumes properties for serving as an emulsifier for still unsaponified fat, and on account of this the velocity of saponification in the final saponification is considerably retarded.

The second less used process for saponification is that in which the saponification is carried out with the fat and lye together in a colloidal state, the so-called cold saponification. In this process the reaction mass is brought to a temperature a little above the melting point of the fat and by extensive stirring kept emulsified for so long until sufficient soap is formed to keep it so by itself, that is, until the mass stiffens.

In the process the saponification is commenced with assumption of the colloidal state and then gradually proceeds further with hardening of the mass to a solid soap.

Such a soap is not suitable as a commercial article. In order to convert it to such it is necessary to re-melt the hardened soap in boiling salt water or the like.

Both methods have the previously-mentioned disadvantages.

In the boiling method the soap cannot be brought to a condition suitable for final saponification, but permits at least an uninterrupted and economic process. The so-called cold saponification, certainly attains conditions suitable for complete saponification; but has the disadvantage that the process up to the finished soap has to be divided and the necessity of re-dissolving the saponified mass in order to be able to treat it further. Also the process is only suitable for fats containing at most 2–3% free fatty acids.

The process of the present invention is a combination of both separate processes into one single process, in which only the final saponification is carried out in a colloidal soap paste so that the saponified mass can be further worked up after a short time.

It has been found that after preliminary saponification the final saponification to complete saponification, can be reached in about one hour, by first boiling the liquid paste solution as usual, but keeping definite proportions of concentration of the mass, whereby the main quantity of the fat is saponified. Thereupon water is added to the mass until the action of the electrolytes is so diminished that the mass is converted into a colloidal solution.

Thus the most favourable conditions for final saponification are reached and this proceeds without any further boiling in a short time so that the further operation of salting out can be proceeded with immediately.

It is necessary that the whole mass of fat and lye which is to be saponified, should contain about 56% of fatty acids. That percentage is necessary to obtain the desired concentration. It is to be pointed out that the addition of water is not a means of making the mass more liquid. On the contrary, the addition of water makes the mass more stiff and makes it appear to be more concentrated. But on adding electrolytes, that is salts or lye, the mass becomes more liquid. Now it is necessary that in the first stage of the process the mass should be fluid, because it is necessary to be able to mix it easily. But in the second stage of the process it is necessary to have a stiffer fluid, because then the mass is a colloidal solution, in which state the remaining traces of unsaponified fats are saponified more rapidly. Therefore it is necessary to add sufficient water to obtain a diminishing of the content of fatty acids from 56 to about 50%. The contents of electrolytes (salts and lye) must be 1% of the whole mass containing 50% of fatty acid, if 15% of palm kernel oil or cocoanut oil are present in the whole mass of the fat, the remainder of the fat being composed of tallow or other fats or oils giving soaps capable of being salted out easily.

If the content of palm kernel oil or cocoanut oil is 40% of the whole mass of the fat, 1½% of electrolytes are necessary.

Only thus is it possible to interfere with the detrimental liquefying action of the electrolytes. For if the mass is too liquid it is not a solution but merely a mixture of soap and liquor; but when it is sufficiently stiff it is a colloidal solution. It is only possible to complete the saponification in the shortest time in such a solution.

Example 1

850 kg. tallow, 150 kg. coconut oil and 480 kg. of lye of about 36° Bé. are boiled as usual, but with such a small addition of water, with the addition of 10 kg. salt, that the soap lye contains about 56% fatty acids. This operation requires 1-2 hours. Now the final saponification is not brought about as in the usual boiling process by boiling for a long time, but by adjusting the excess of lye to 0.5% NaOH and adding 130 kg, of water, whereby the fatty acid content is reduced to about 50% and a colloidal solution is obtained. After a short boiling up, the steam is shut off and the final saponification now completes itself in about one hour.

Example 2

300 kg. of bone fat, 300 kg. of tallow, 400 kg. palm kernel oil, 500 kg. of lye are combined as in Example 1, but in this case 20 kg. of salt are added, that is, the electrolyte content of the mixture must be somewhat increased with the increased content of palm kernel oil containing fat in the fat mixture.

The further steps are then carried out as in Example 1.

If the residue of the previous boiling is to be further boiled, then its electrolyte content is to be allowed for and a correspondingly smaller amount of salt is added.

After completion of the saponification the mass is purified free from glycerine and salted out in the usual manner and then subjected to the known processes.

The hitherto boiling for days to bring about often incomplete saponification is replaced by the new process above described of allowing the soap mass in a globular paste to stand for about one hour with ensuring complete saponification.

What I claim is:

A process for the manufacture of soap comprising a first and main saponification of oils and fats succeeded by a second and final saponification, the first saponification being effected by boiling the oils and fats in admixture with alkali lye, a small quantity of electrolyte and water, the mixture being boiled containing about 56% of combined and uncombined fatty acids and between 1% and 1½% of electrolyte, which proportions are such that the mixture, after boiling, is a liquid capable of being rendered viscous by the addition of a little water, and the second and final saponification being effected by rendering the liquid mass viscous by adding water until the mixture contains about 50% of combined and uncombined fatty acids and then boiling for a short time and allowing the mass to stand, as set forth.

In testimony whereof I have signed my name to this specification.

CLEMENS BERGELL.